United States Patent [19]

Butler, Jr. et al.

[11] 4,288,273

[45] Sep. 8, 1981

[54] METHOD AND APPARATUS FOR MAKING CORRUGATED BOARD

[75] Inventors: Richard A. Butler, Jr., Greenwich, Conn.; Bucky Crowley, Newton, Mass.

[73] Assignee: Butler Greenwich Inc., Greenwich, Conn.

[21] Appl. No.: 148,580

[22] Filed: May 12, 1980

[51] Int. Cl.[3] .............................................. B32B 31/00

[52] U.S. Cl. .................................... 156/361; 156/470; 156/494

[58] Field of Search ................ 156/205, 210, 470–473, 156/494, 361, 64

[56] References Cited

U.S. PATENT DOCUMENTS 3,682,736 8/1972 Akamatsu .......................... 156/210

*Primary Examiner*—David A. Simmons

*Attorney, Agent, or Firm*—Cesari and McKenna

[57] ABSTRACT

A corrugator line includes a single facer and a double backer with a horizontal bridge extending between them. Instead of conducting the web from the single facer to the double backer as fan folds on a horizontal belt conveyor, a dancer type accumulator is positioned on the bridge between the single facer and the double backer and the web is looped back and forth between the accumulator stationary rollers and its movable dancer and the dancer is force loaded away from the stationary rollers so as to maintain substantially constant tension in the moving web. Provision is made for controlling the speed of the single facer or the double backer in response to excursions of the dancer from a reference position to allow the single face material to spend a uniform time between the single face and double back processes. Also, a steering assembly is positioned on the bridge to align the web from the single facer with the machine center line of the double backer.

8 Claims, 2 Drawing Figures

METHOD AND APPARATUS FOR MAKING CORRUGATED BOARD

This invention relates to method and apparatus for making corrugated paperboard. It relates more particularly to an improved technique for handling single-face web in a corrugator combiner line.

BACKGROUND OF THE INVENTION

In its simplest form, the corrugating line includes a so-called single facer and a so-called double backer which are spaced apart from one another under a horizontal bridge. A corrugating medium, such as paper web, is drawn from a supply roll located under the bridge into the single facer. A second paper web, the so-called liner, drawn from a second supply roll located under the bridge is also fed into the single facer. The single facer subjects the incoming corrugating medium to steam and passes it between a pair of corrugating rollers which cause the medium to assume its familiar fluted or rippled configuration. Thence, the fluted web is passed through a gluing station which applies glue to the tips of the flutes at one side of the web. The liner material is, in turn, fed over a series of rollers and brought into contact with the glue-bearing side of the fluted web. Thus the two webs are laminated so that so-called single-face web (which is longitudinally flexible and laterally rigid) emerges from the single facer.

An inclined, double-belt sandwich conveyor is located above, and is driven by, the single facer. This conveyor is run slightly overspeed to impart tension to the single-face web. The conveyor carries the single-face paper upward and away from the single facer and drops it onto a horizontal belt conveyor located on the bridge and which extends all the way along the bridge to the double backer. The bridge conveyor is operated at a slower speed than the inclined conveyor causing the single-face web to fanfold in loops as it falls onto the conveyor belt. This permits the bridge conveyor to store a relatively large quantity of single-face web. The belt conveyor thus forms a buffer or accumulator for supplying the needs of the double backer when the single facer is slowed down during adjustments or paper changes. Likewise, if the double backer is slowed down or stopped, the single facer can continue to run at normal speed building up the supply of web on the conveyor. The storage of the single face material on the belt conveyor is also important because it provides extra time for drying and bonding of the single face material to insure a more permanent adhesion of the fluted web to the liner web.

Upon leaving the belt conveyor, the single-face web is drawn down into a glue station just ahead of the double backer there glue is applied to the tips of the exposed flutes on the single-face material. Also, web which will constitute the bottom liner of the corrugated board is drawn from a supply roll under the bridge through a preheater into the double backer. In the double backer, the prepared single-face material and the linear material are brought together at a nip where they adhere, thereby forming the completed corrugated board. By the time the board leaves the double backer, the three webs have dried and the glue has set so that the laminated board can be cut into sheets and prepared for shipping or storage.

The usual corrugating line also includes various stations for preconditioning and preheating the webs prior to their entrance into the single facer and double backer.

A major problem with prior corrugating lines of the type just described is that there are variations in the degree of drying of the glue on the two layers of liner web. More particularly, the moisture content of the webs and the degree of drying of the glue on the single-face web depends upon the length of time that the paper spends on the belt conveyor on its way to the double backer. Since the amount of material on the bridge is not known with any degree of certainty, an excessive amount is usually stored there so that there is a considerable delay before the material reaches the double backer. Resultantly, the single face material must be preconditioned by steaming it before it enters that unit.

Also the elongations of the webs comprising the board vary due to changes in humidity and temperature and upon the fact that the untensioned single face material on the conveyor is left to dry in accordion folds. Also, of course, the stresses in the single face material may vary along its length and width depending upon its lie on the belt conveyor. On the other hand, some shrinkage of the single-face material may occur as it proceeds along the conveyor. All of these factors cause warpage in the finished corrugated board as well as variations and irregularities in the flutes or corrugations along and across the board.

A further disadvantage of the prior corrugators stems from the fact that a series of finger crescents are positioned along the length of the corrugator roll adjacent the gluing station to control the amount of glue that is applied to the flutes of the corrugating medium. Due to the construction and operation of the single facer, the edges of the single face web in that unit must lie between adjacent finger crescents to avoid damage to the web. This means that the web leaving the single-facer may not be aligned with the machine center-line of the double backer.

To compensate for this misalignment, a pair of side guards or shoes are mounted adjacent each edge of the web at the entrance end of the belt conveyor positioned so as to establish the desired path of web travel. If the web is out of alignment, one shoe or the other pushes against the web edge so that the web more or less tracks along the desired alignment as it approaches the double backer. These shoes inevitably crush the edges of the single face web so that the corrugated board emerging from the double backer may be defective along one or both of its edges. Furthermore, these shoes must be adjusted during a width change and, if adjusted too soon or too late, loss of steering or crushed web can result. Actually, in many cases the damage is sufficiently extensive that the corrugated board has to be edge-trimmed in order to remove the defective material. This, of course, creates wastage and increases costs. Paper webs wider than the product are used to allor for this trim.

A further disadvantage of the prior apparatus of this general type is that, due to the fanfold mode of storing single-face material on the belt conveyor, one cannot know with any reasonable degree of certainty how much web is stored on the conveyor at any given time. Therefore, an operator has to frequently change the speed of the single facer in order to avoid feeding too little or storing too much single-face web on the bridge.

Lack of knowledge of the precise amount of material in buffer storage also makes it difficult to use up the material on the conveyor belt to avoid wastage when changing over from one web to another, for example, when changing flute size or board width.

For all of the aforesaid reasons, conventional corrugator lines are not as productive and efficient as they might be. Also they do not produce corrugated board of as high a quality as might be desired.

SUMMARY OF THE INVENTION

Accordingly, it is an aim of the present invention to provide a complete controlled corrugated board manufacturing system.

A further object is to provide a method and apparatus for producing high quality corrugated board.

Another object of the invention is to provide an arrangement of this type, which produces corrugated board having flutes or corrugations which are substantially uniform across the entire length and width of the board.

Another object of the invention is to provide corrugator apparatus which minimizes web wastage, particularly when changing from one width corrugated board to another.

Another more specific object of the invention is to provide method and means for maintaining close control over the time and tension of the single-face web in its travel from the single-facer to the double-backer sections of a corrugator line.

Other objects will, in part, be obvious and will, in part, appear hereinafter.

The invention accordingly comprises the several steps and the relation of one or more steps with respect to each of the others and the apparatus embodying the features of construction, combination of elements, and arrangement of parts all as exemplified in the following detailed description, and the scope of the invention will be indicated in the claims.

We are concerned here with providing a complete system for converting liner material and corrugating medium wound on rolls to finished slitted and scored corrugated board of any selected crush strength and caliper. The present apparatus includes a conventional single facer and a conventional double backer spaced apart at the opposite ends of an overhead bridge. The single facer draws corrugating medium and liner material from feed rolls positioned under the bridge. The single facer conditions the corrugating medium and liner material and corrugates the latter before gluing it to the liner material so that there emerges from that unit, single-face paper composed of corrugated paper laminated to a paper liner. The single face material is then conveyed along the bridge to the double backer which also receives paper liner material from a feed roll positioned under the bridge. The double backer conditions the single face material and the liner material and bonds them together creating the finished corrugated board. After being dried, the finished board is slit, scored and severed into lengths for further processing or storage.

Instead of using a belt conveyor to store and transport the single-face material along the bridge to the double backer, however, the present apparatus utilizes a horizontal dancer accumulator assembly which is force-loaded to maintain the single face material under constant tension all the way from the single facer to the double backer. More particularly, the web material is looped back and forth between a set of stationary rollers and a set of rollers mounted on a dancer which is movable along a horizontal track. A chain drive biases the dancer away from the stationary rollers with a constant force that imparts a set tension to the single face material.

It should be mentioned at this point that it is completely contrary to the prevailing practice to subject the single-face material used to make corrugated board to high tension in this fashion. This is because, in order to loop the single face material back and forth between the stationary and moving rollers, the fluted side of the single-face paper has to engage around a plurality of such rollers. It was thought that this would crush the flutes on the single-face paper, thereby making that paper unsuitable for use as a component of corrugated board.

We have discovered, however, that the quality of the paperboard does not depend so much on the shape of the flutes as on their uniformity throughout the board. We have further determined that when the single-face material is maintained under constant tension between the single facer and the double backer, and that tension is not in excess of about ten pounds per linear inch, the engagement of the fluted side of the material around the rollers does not excessively distort or deform the flutes. Rather, the flutes assume a cross-sectional shape which is uniform throughout the entire length and breadth of the single-face material thereby producing especially uniform paper board.

Further, by detecting deviations of the dancer from a set reference position, one may monitor the amount of single-face material in storage at any given time. Accordingly, less buffer storage is required so that there is less delay before the single face material enters the double backer and less loss of heat and moisture from that material. Resultantly, the material does not have to be as preconditioned before entering the double backer. During a given run then, one can control exactly how long the single-face material remains on the bridge by controlling the single face line speed and dancer position and thereby precisely control the drying time of the glue that laminates the fluted corrugating medium to the liner and the condition of the single face material generally.

Such maintenance of close control over the single-face material between the single facer and the double backer as to time and tension assures that when that material is laminated to the bottom liner in the double backer, the resultant paperboard has very uniformly shaped flutes, yielding an exceptionally high board crush strength and uniform elongations of the corrugating medium and the upper and lower liners so that board warpage is held to a minimum.

The fact that the present apparatus maintains single-face material under controlled tension on the bridge also means that now conventional steering rollers responding to signals from a web edge sensor may be positioned upstream or downstream from the accumulator in order to align the single face web with the machine center line of the double backer. Consequently, the web edge-engaging shoes formerly used for this purpose can be dispensed with, thereby avoiding the problem of web edge damage which was a source of a considerable amount of wastage in prior corrugator lines. Furthermore, the ability of the present apparatus to continuously steer the single-face material approaching the double backer assures that that material will be precisely superimposed on the bottom liner in the double backer so that the resultant paperboard has no overhanging liner edges which would have to be trimmed away.

As mentioned previously, the present apparatus controls the position of the accumulator dancer so that the exact amount of single face material stored in the accumulator at any given time is known precisely. This means that when the individual webs serving the single facer and double backer are about to expire, they can be spliced in synchronism to corresponding ready webs so that all splices fall within the same relatively short board segment. Consequently the defective board containing these web joints can be excised from the board run with minimum wastage.

Further, by maintaining a fixed amount of web in the accumulator, the present system can automatically control the speed of the single facer (or the double backer) in order to maintain the bridge storage constant, thereby avoiding the need for an operator to perform that function.

Finally, since the precise amount of web in storage is known and can be manipulated as required, a small splicer head can be positioned just ahead of the accumulator so that an order change, say, from one board flute size to another, can be effected in a minimum amount of time and without wasting the material stored in the accumulator and without having to carry the web all the way forward from the roll stand serving the single facer as is required with prior comparable corrugators of this general type. With all of the aforesaid advantages, then, the present apparatus should find wide application in the corrugator lines which fabricate corrugated board.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
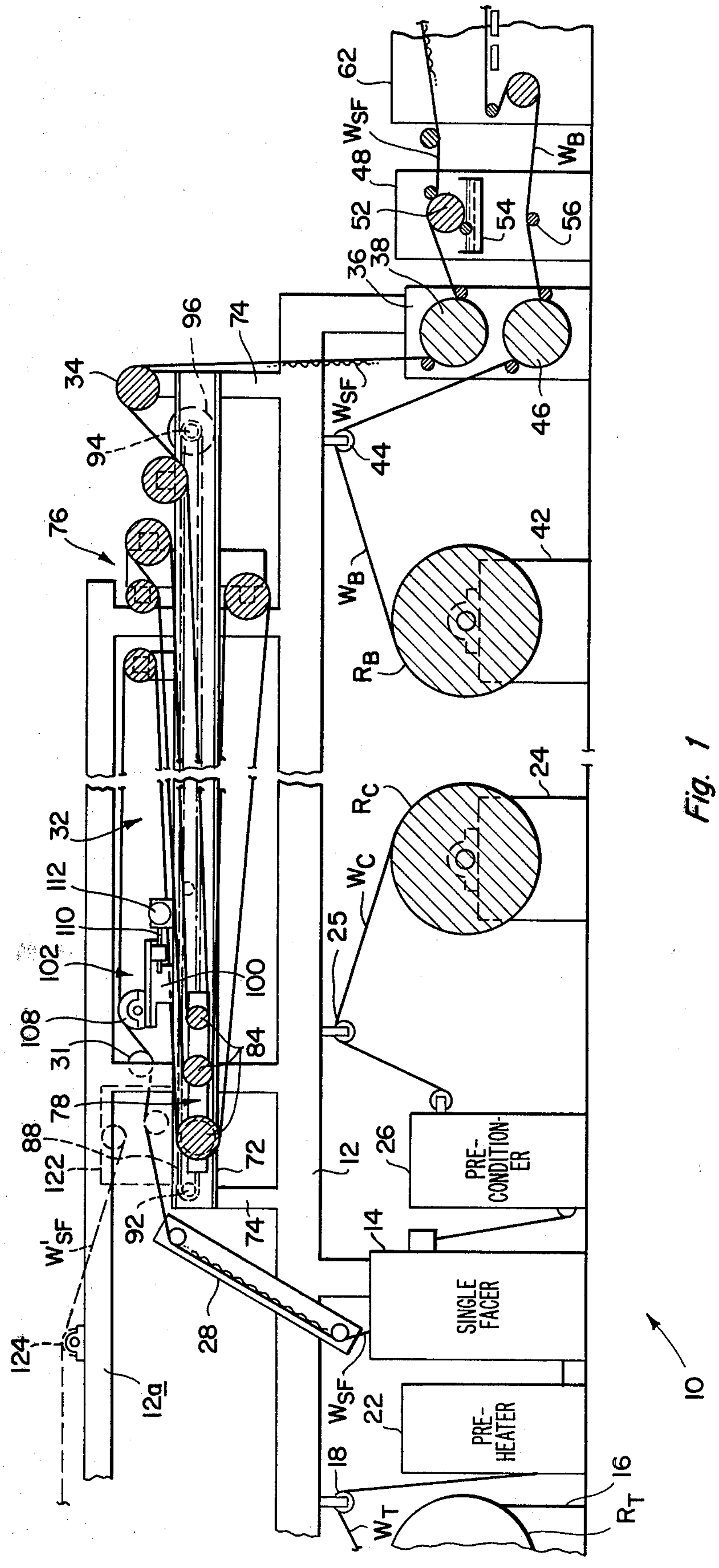
FIG. 1 is side elevational view in diagrammatic form of a corrugator line employing apparatus made in accordance with this invention.

Referring now to FIG. 1 of the drawings, the subject corrugator line is indicated generally at 10. Its various sections are positioned above and below a horizontal bridge 12 supported above the floor. These sections include a so-called single facer 14 positioned under the bridge adjacent one end thereof. The single facer receives paper web $W_T$ from a roll $R_T$ mounted on a roll stand 16. This web $W_T$ constitutes the liner of the corrugated board. The web from roll $R_T$ passes over an idler 18 suspended from the bridge and is guided through a conventional preheater 22 on its way to the single facer. The preheater heats the paper to a selected temperature to prepare it for bonding in the single facer 14. The single facer also receives web $W_C$ from a roll $R_C$ mounted on a roll stand 24 located under the bridge 12. The web $W_C$ constitutes the corrugating medium which forms the fluted component of the corrugated board. Web $W_C$ is guided by an idler 25 suspended from the bridge through a preconditioner 26 which moistens and heats the web prior to its entry into the single facer.

In the single facer 14 which is of conventional construction, the web $W_C$ is transversely fluted and glued to the liner web $W_T$. The resultant laminated web or so-called single faced web $W_{SF}$ exits the single facer through its top wall. Thence, that web is guided up by way of a conveyor 28 to a small splicer head 122 mounted on the bridge. From the splicer head the web $W_{SF}$ proceeds under an idler 31 to a horizontal dancer-type accumulator shown generally at 32 supported on the bridge and to be described in more detail later. Suffice it to say at this point that the accumulator 32 stores a selectable length of the single face web and maintains that web under substantially constant tension.

The web leaving accumulator 32 is guided over a roller 34 and thence may be led down to a preheater 36 positioned under the bridge 12 at the opposite end thereof from the single facer 14. In the preheater, the web is guided around a drum 38 which is heated to a selected temperature to precondition it for bonding to the top liner component of the corrugated board. The top liner material $W_B$ is drawn from a roll $R_B$ mounted on a roll stand 42 located adjacent to the preheater. The web $W_B$ is guided over an idler 44 suspended from the bridge and into the preheater 36 where it engages around a heated drum 46. The preheater drums 38 and 46 are both equipped with the usual adjustable wrap rollers to control the drum sectors engaged by the respective webs.

Actually since the single face web $W_{SF}$ spends so little time on the bridge because only a small length of web is needed in storage in view of the fact that the present apparatus maintains such close control over storage amount, the $W_{SF}$ is still hot and moist at the exit end of the bridge. Therefore, it need not be subjected to such preheating, tensioning step.

Upon leaving the preheater 36 or the bridge directly, the single faced web $W_{SF}$ is conducted to an adhesive station 48 where the fluted side of the web is contacted by an adhesive applicator roll 52 which obtains adhesive from a pan 54. The liner web $W_B$, on the other hand, is guided directly through the adhesive station over an idler 56. Thence, both webs enter a double backer shown generally at 62. The double backer is of conventional construction so that it will not be detailed here. In short, the functions of that machine are to apply glue to the fluted side of web $W_{SF}$, then to bring the single face web $W_{SF}$ and the liner web $W_B$ together at a nip so that the fluted side of the single face material is adhered to the liner material and finally to dry or cure the adhesive thereby forming the finished corrugated board. From the double backer 62, the finished board is conducted to various slitters and sheeters (not shown) which cut the board into sheets of the desired size.

Figure 2:
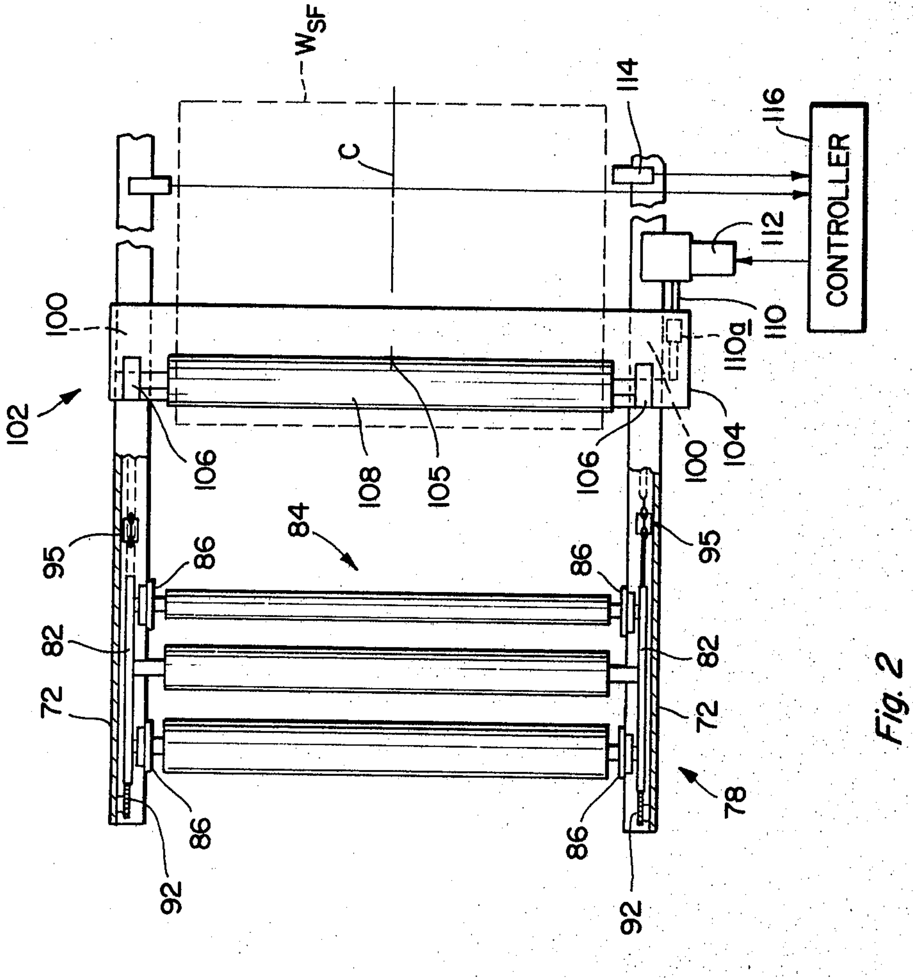
FIG. 2 is a fragmentary top plan view of the apparatus shown in FIG. 1.

Referring to FIGS. 1 and 2, the accumulator 32 is mounted between a pair of parallel horizontal rails 72 supported above bridge 12 by legs 74. The accumulator includes a stationary set of laterally disposed, parallel, spaced-apart rollers shown generally at 76 whose ends are journalled in side plates supported by rails 72 near the exit end of the bridge. The accumulator also includes a dancer assembly shown generally at 78 movable along rails 72 toward and away from the stationary rollers 76. The dancer assembly has a pair of side plates 82 positioned parallel to and just inside rails 72. Located between the side plates 82 are a set of laterally disposed, spaced-apart, parallel dancer rollers shown generally at 84 whose shafts are journaled for rotation in the side plates.

In the illustrated apparatus embodiment, there are three such dancer rollers 84 and the shafts of the two outermost such rollers carry flanged plastic wheels 86 which ride on rails 72 so that the dancer assembly as a whole is movable along those rails toward and away from the stationary rollers 76. In the present apparatus, the rollers 84 as well as the stationary rollers 76 consist of hollow steel oilwell casings having relatively thin walls. Consequently, they are relatively lightweight and fairly inexpensive to make. The rollers have large diameters for applying uniform pressure on the flutes of the board. Some rollers which contact the fluted side of the material have thick resilient coverings which provide a uniform pressure to all of the fluted medium and not just the tips thereof. Further, they have minimum inertia so that the dancer assembly can respond quickly to web $W_{SF}$ tension changes.

Wheels 86 are spring-loaded toward their respective rails by coil springs. Consequently, the dancer assembly 78 remains aligned with the rails 72 and the bridge as a whole as the dancer assembly travels back and forth along rails 72. Resultantly, the tension in the single face web $W_{SF}$ in the accumulator 32 is uniform across the full web width as the web proceeds through the accumulator.

The opposite ends of a chain 88 are connected to the opposite ends of each side plate 82 of the dancer assembly thereby forming a closed loop. The left hand end of each loop as it appears in FIG. 1 is engaged around a sprocket 92 rotatively mounted on a rail 72. The right hand end of each loop as viewed in that same figure is trained around a sprocket 94 which is rotated by a dancer drive assembly 96. Additional sprockets 95 are spaced along rails 72 to support the chain stretches. The drive assembly 96 includes an electric motor which rotates the sprocket 94 through a conventional pneumatic clutch. By adjusting the torque of the clutch, the dancer assembly 78 can be biased away from the fixed rollers 76 by a selected constant force, so as to impart a selected constant tension to the web traveling through the accumulator.

Still referring to FIGS. 1 and 2, supported on rails 72 by an upstanding, inverted, U-shaped bracket 100 is a web steering assembly shown generally at 102. In the illustrated corrugator, the steering assembly is located near the entrance end of the bridge upstream from the accumulator per se. However, it could just as well be positioned at the other end and receive the web $W_{SF}$ leaving the accumulator. In any event, the steering assembly includes a horizontal, generally rectangular plate 104 whose ends extend out slightly beyond rails 72. Plate 104 is pivotally connected at its center point 105 to the top wall of bracket 100, said center point being positioned on the machine centerline C (FIG. 2) of the double backer 62.

Projecting up from the opposite ends of plate 104 above rails 72 are a pair of upstanding brackets 106. Positioned between the brackets 106 is a laterally disposed guide roller 108 whose shaft is journaled for rotation in the brackets. Plate 104 as well as the roller 108 supported thereon are pivoted about the assembly axis at 105 by a lead screw 110 whose nut 110*a* is driven by an electric motor 112. Conventional web edge sensors 114 located near the entrance of the double backer 62 sense deviations in the center line of the web to one side or the other from the machine center line C. Sensors 114 can be simply finger switches, back pressure sensors, infra-red detectors or other types of devices which sense the presence or absence of web. In any event, if the center line of the web deviates from the machine center line C, the sensors 114 issue signals to a conventional electrical controller 116 which thereupon causes motor 112 to tilt the steering rollers about the point 105 in one direction or the other to return the web to the correct position. A web steering arrangement such as this is quite conventional and, therefore, it need not be detailed here. One such steering assembly is disclosed in U.S. Pat. No. 4,069,959.

Referring to FIG. 1, the single face web $W_{SF}$, upon leaving splicer head 28, first passes over the steering roller 108 and thence loops back and forth between the fixed dancer rollers 76 and the movable dancer rollers 84 forming a multiplicity of bights before leaving the accumulator over the idler roller 34 and proceeding into the double backer (optionally via preheater 36). In a typical apparatus, the amount of web stored in accumulator 32 need not be more than approximately six times the length of the bridge.

In accordance with this invention, the dancer assembly 78 is force-loaded away from the fixed rollers 76 with a selected constant force to impart a selected tension to the web $W_{SF}$ stretching between the single facer 14 and the double backer 62. This arrangement gives the present system several distinct advantages over prior corrugators which fan-fold untensioned single-face web on a belt conveyor leading from the single facer to the double backer.

More particularly, in the present apparatus the fluted side of the tensioned single-face web engages around various ones of the rollers on the bridge 12. This engagement ensures that the flute height is substantially uniform from flute to flute and all along the lengths of the flutes. We have found that, for best results, the tension in the single face web should be from one-half to ten pounds per linear inch depending upon the gauges of the corrugating medium and liner board. This amount of tension is found to achieve uniform flute height without crushing the flutes excessively against the top liner.

The maintenance of constant tension in the single face paper also ensures that the amount of elongation of the single face web is uniform across the entire width of the web and all along its length. Finally, for the first time, the maintenance of positive control over the tension in the single-face web proceeding from the single facer to the double backer permits a steering roller arrangement to be used to align the single material leaving the single facer with the machine center line of the double backer. This permits the elimination of the edge guide shoes formerly used for this purpose with their attendant problems of edge damage to the single face web and assures that the single face web is correctly aligned with the liner material in the double backer. With the present arrangement, the finished corrugator board leaving the double backer has an unusually uniform crush strength along its entire length and breadth. Also, because of the aforementioned uniform elongation and residence time of the single face material on the bridge, the finished board is characterized by minimal warpage. The net result is that the product leaving the double backer does not have to be edge trimmed to remove damaged board material and indeed substantially the entire output of the double backer constitutes a useful commercial product.

Further in accordance with this invention, provision is made for monitoring the position of the dancer 78 relative to a reference position. Consequently, at any given time, the precise amount of single face material in storage between the single facer and the double backer units is known. This means that, for the first time, the operations of the single facer and the double backer can truly be coordinated with the board spending a uniform amount of time on the bridge independent of line speed. Furthermore, that can be done completely automatically. Therefore, there is no longer any need of an operator continually increasing or decreasing the speed of the single facer (or the double backer) to ensure that the amount of material stored on the bridge does not become too little or too great.

The accumulator described herein also greatly facilitates effecting a change order, say, from one flute size to another in the single face web. Since the amount of single facer material in storage at any given time is known and depends upon the position of the dancer assembly 78, the small splicer head indicated in dotted lines at 122 in FIG. 1 may be mounted on the bridge just ahead of the accumulator 32 can accomplish such a change.

More particularly, another single facer (not shown) mounted on an elevated section 12*a* of the bridge to the left of the splice head 122 can supply a second single face web $W'_{SF}$ having the different flute configuration. This web is trained over an idler 124 and its leading end is prepared and positioned in the usual way on a splicing bar or roller in splicing head 122. Upon command, the single facer 14 is slowed and brought to a stop. Next the leading end of web $W'_{SF}$ carrying a double faced adhesive strip is pressed against the running web $W_{SF}$. Following this, a knife severs web $W_{SF}$ just behind the splice. Finally, the second single facer is brought up to line speed so that now the new single face web $W'_{SF}$ enters the double backer.

All during the splice sequence, the double backer 62 runs at full line speed drawing its needs from the supply of single face web $W_{SF}$ stored in accumulator 32. At the end of the splice sequence, only a minimum amount of web remains in the accumulator, i.e. dancer 78 resides close to stationery rollers 76. Accordingly, the supply of new web $W'_{SF}$ is built up by running the second single facer over-speed until the dancer 78 moves back to its normal running position.

The control circuitry for controlling the splice sequence described above and for maintaining constant tension in the running web during normal operation and during the splice sequence and for monitoring the position of dancer 78 is more or less conventional and accordingly it will not be detailed here. Suitable such control arrangements are described in U.S. Pat. Nos. 3,822,838 and 4,015,794. Suffice it to say that such control systems sense the position of the dancer. In the present system, this can be accomplished by a shaft encoder driven by one of the chain sprockets 95. Also web line speed is sensed, say, by a second encoder driven by roller 34 at the output end of the accumulator. Further, the speed of the web out of the single facer is monitored by a third encoder driven by a roller in conveyor 28, for example. These signals are processed in a controller whose output controls the speed of the single facer to maintain the dancer 78 at a selected reference position.

Actually it is contemplated here that all of the various sections of a complete corrugator line from the roll stands at the input end of the line to the slitters and scorers at the output end thereof be controlled along with web steering assemblies between the various sections to maintain constant tension in and alignment of the various liner webs and corrugating medium webs as they travel through the line to form the finished board. Consequently, the present system should for the first time permit coordinated operation of all the sections of a corrugator line to produce better board more efficiently and at less cost than is now possible with present machinery. Accordingly, it should find wide application in the corrugator industry.

It will thus be seen that the objects set forth above, among those made apparent from the preceding description, are efficiently attained, and, since certain changes may be made in the above sequence of steps and in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A corrugator comprising

A. a single facer,

B. means for conducting liner web to the single facer,

C. means for conducting corrugating medium web to the single facer, said single facer fluting the corrugating medium web and laminating said web to produce single face web having a fluted face, D. a double backer, E. means for conducting the single face web to the double backer, said conducting means including a web accumulator located between the single facer and the double backer, said accumulator comprising (1) one or more stationary rollers, (2) one or more dancer rollers, said single face web being looped back and forth between said stationary dancer rollers so that the fluted face of said single face web engages around at least some of said rollers, (3) means defining a track for the dancer rollers so that the dancer rollers can move toward or away from the stationary rollers, (4) means for force loading the dancer rollers along said track away from the stationary rollers so that the single face web being conducted from the single facer to the double backer is maintained under low and substantially constant tension across its full width thereby imparting a low and substantially uniform pressure to the flutes in the single face web, (5) means for controlling the speed of the single facer or the double backer in response to the positions of the dancer rollers with respect to a reference position to allow control over either the amount of material or the amount of time the material spends between the single face and the double back processes, independent of the overall process speed and F. means for conducting liner webs to the double backer for laminating with the single face web conducted thereto so as to produce corrugated board having minimum warpage and substantially uniform crush strength along its length and breadth.

2. The corrugator defined in claim 1 and

A. further including a horizontal bridge extending between the single facer and the double backer, and B. wherein the accumulator is mounted on the bridge.

3. The corrugator defined in claim 2 and further including

A. one or more additional sources of web, and

B. a web splicing head mounted on the bridge downstream from the single facer and said additional web sources and upstream from the accumulator for optionally receiving single face web and webs from said additional sources to facilitate corrugator order changes.

4. The corrugator defined in claim 2 and further including a web steering assembly mounted on the bridge between the single facer and the double backer to align the single face web from the single facer with the machine center line of the double backer.

5. The corrugator defined in claim 4 and further including

A. sensing means positioned at a web edge along the web path between the single facer and the double backer for generating an electrical signal in response to the lateral location of the web edge, and B. means responsive to the output of the sensing means for controlling the steering angle of the steering assembly with respect to said machine center line.

6. The corrugator defined in claim 1 wherein

A. the track is defined by a pair of spaced parallel rails,

B. the dancer rollers are connected parallel to one another to form a movable carriage, C. a plurality of flanged wheels are rotatively mounted to the carriage and positioned for rolling engagement on said rails.

7. The corrugator defined in claim 6 and further including means for biasing at least some of the wheels away from the carriage toward the tracks so as to maintain the dancer rollers perpendicular to the tracks as they move along the tracks.

8. The corrugator defined in claim 7 wherein the rollers comprise oilwell casings.

* * * * *